US010723452B2

(12) United States Patent
Simonetti et al.

(10) Patent No.: US 10,723,452 B2
(45) Date of Patent: Jul. 28, 2020

(54) ENGINE SYSTEMS FOR ROTORCRAFT

(71) Applicant: Sikorsky Aircraft Corporation, Stratford, CT (US)

(72) Inventors: Joseph L. Simonetti, Southbury, CT (US); Mark D. Bystry, Jr., Stratford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 440 days.

(21) Appl. No.: 15/433,303

(22) Filed: Feb. 15, 2017

(65) Prior Publication Data

US 2018/0229854 A1   Aug. 16, 2018

(51) Int. Cl.
*B64D 35/08* (2006.01)
*B64C 27/82* (2006.01)
*B64C 27/00* (2006.01)

(52) U.S. Cl.
CPC ............ *B64C 27/82* (2013.01); *B64C 27/006* (2013.01); *B64D 35/08* (2013.01)

(58) Field of Classification Search
CPC .. B64D 27/24; B64D 2027/026; B64D 35/08; B64C 27/12; B64C 27/82; B64C 27/006
See application file for complete search history.

(56) References Cited

U.S. PATENT DOCUMENTS

| 9,194,285 B2 | 11/2015 | Botti et al. |
| 9,446,842 B2 | 9/2016 | Luyks |
| 2012/0025032 A1* | 2/2012 | Hopdjanian ......... B60L 3/0046 244/53 R |
| 2013/0092789 A1* | 4/2013 | Botti ..................... B60L 50/15 244/54 |
| 2013/0119185 A1* | 5/2013 | Botti ..................... B64C 27/14 244/17.21 |
| 2013/0147204 A1* | 6/2013 | Botti ..................... F02B 63/04 290/1 A |
| 2014/0117148 A1* | 5/2014 | Dyrla .................... B64C 27/14 244/17.13 |
| 2015/0028153 A1* | 1/2015 | Rossotto ............... B64C 27/00 244/17.13 |
| 2015/0122944 A1* | 5/2015 | Dauriac ................ B64D 35/08 244/58 |
| 2015/0125258 A1* | 5/2015 | Certain ................. B64D 35/08 415/1 |
| 2016/0376017 A1* | 12/2016 | Rossotto ............... F02C 6/206 701/99 |
| 2017/0225573 A1* | 8/2017 | Waltner ................ B64C 27/12 |
| 2018/0009542 A1* | 1/2018 | Kuster .................. B64D 27/24 |
| 2018/0229851 A1* | 8/2018 | Joshi .................... B64D 31/06 |

FOREIGN PATENT DOCUMENTS

WO   WO-2007080617 A1   7/2007

* cited by examiner

*Primary Examiner* — Philip J Bonzell
*Assistant Examiner* — Tye William Abell
(74) *Attorney, Agent, or Firm* — Cantor Colburn LLP

(57) ABSTRACT

A rotorcraft includes at least one first engine operatively connected to a first rotor, and a second engine operatively connected to at least one of a second rotor or an electrical generator for driving an electrical system, wherein the second engine is a different size than the first engine. The second engine can be smaller than the at least one first engine, for example.

9 Claims, 2 Drawing Sheets

ENGINE SYSTEMS FOR ROTORCRAFT

BACKGROUND

1. Field

The present disclosure relates to rotorcraft, more specifically to engine systems for rotorcraft.

2. Description of Related Art

In traditional rotorcraft, a power split between the main rotor and tail rotor/propulsor is typically managed by mechanically combining one or more main engines (i.e., of the same type) to multiple drivetrains. This requires complex mechanics and gearing, and causes inefficiency.

Such conventional methods and systems have generally been considered satisfactory for their intended purpose. However, there is still a need in the art for engine systems for rotorcraft. The present disclosure provides a solution for this need.

SUMMARY

A rotorcraft includes at least one first engine operatively connected to a first rotor, and a second engine operatively connected to at least one of a second rotor or an electrical generator for driving an electrical system, wherein the second engine is a different size than the first engine. The second engine can be smaller than the at least one first engine, for example.

In certain embodiments, the second rotor can be a tail rotor. In certain embodiments, the second engine is an auxiliary power unit (APU) for the rotorcraft.

The second engine can include a through shaft and a clutch system to selectively engage the through shaft, wherein the through shaft is configured to operatively connect the at least one first engine to the second rotor to drive the second rotor and/or to operatively connect the second engine to the first rotor to drive the first rotor when the clutch system is engaged. The rotorcraft can include a control system configured to operate the clutch system.

The control system can be configured to determine whether the second engine has failed to engage the clutch system to cause the first engine to drive the second rotor. In certain embodiments, the control system can be configured to determine whether at least one first engine has failed to engage the clutch system to cause the second engine to drive the first rotor.

The at least one first engine and second engine can be turbomachines or any other suitable type of engine. In certain embodiments, the at least one first engine can include two engines connected to the main rotor via a gear box.

The through shaft of the second engine can be connected to the gear box on a first end, or to any other suitable portion of the rotorcraft or the at least one first engine to drive or be driven from the first rotor or the at least one first engine in a failure condition, for example. In certain embodiments, the through shaft of the second engine is connected to the second rotor at a second end.

In accordance with at least one aspect of this disclosure, a method can include determining a state of at least one first engine and/or a second engine to determine if engine failure of the at least one first engine or the second engine has occurred. If engine failure has occurred, the method includes engaging a clutch system to selectively engage a through shaft of the second engine to operatively connect the at least one first engine to the second rotor to drive the second rotor and/or to operatively connect the second engine to the first rotor to drive the first rotor.

Determining a state of the at least one first engine and/or the second engine can be performed by a control system, e.g., as described hereinabove. The control system can automatically engage the clutch system based on the determination of an engine failure.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
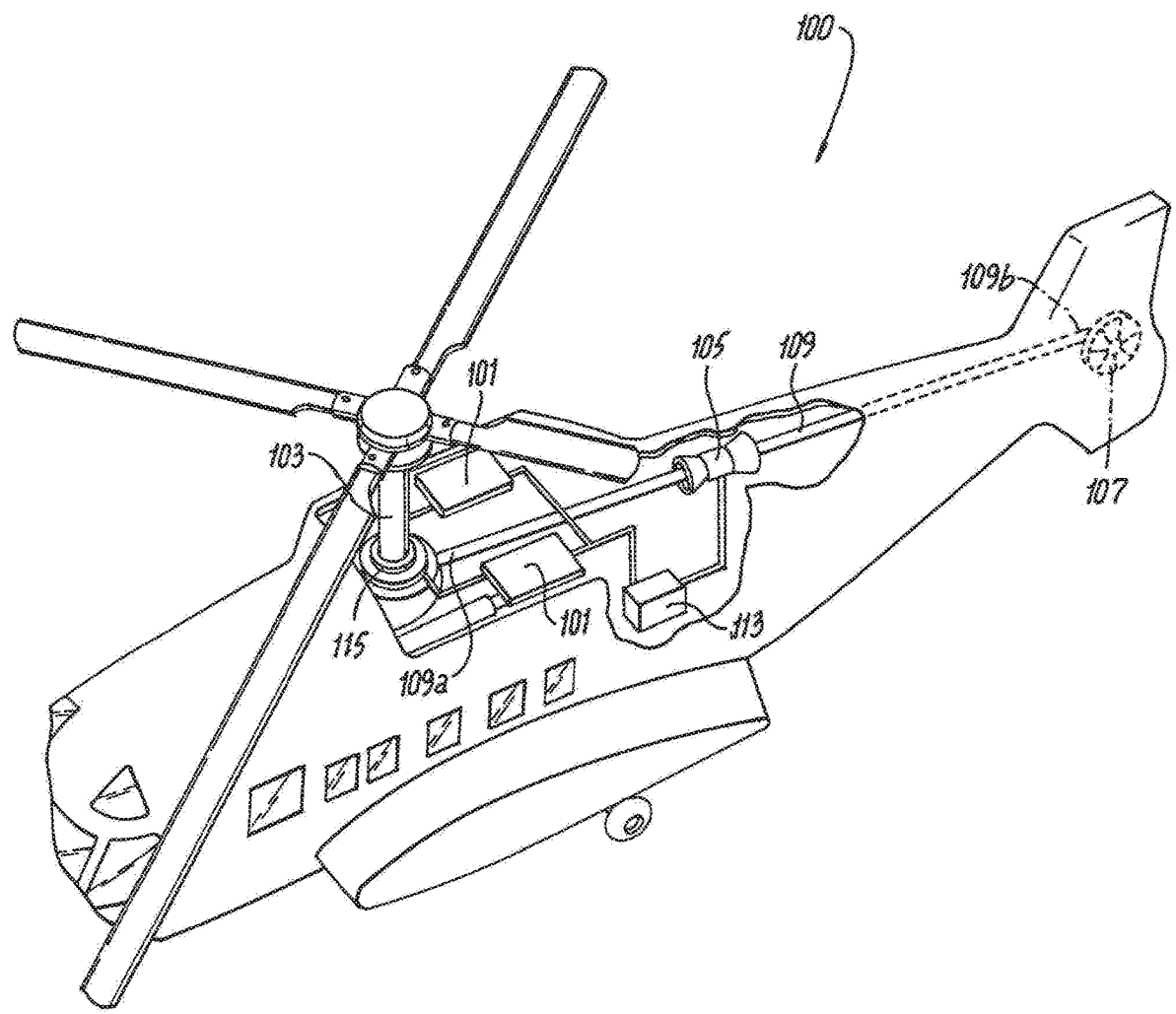
FIG. 1 is a schematic view of an embodiment of a rotorcraft in accordance with this disclosure.
Figure 2:
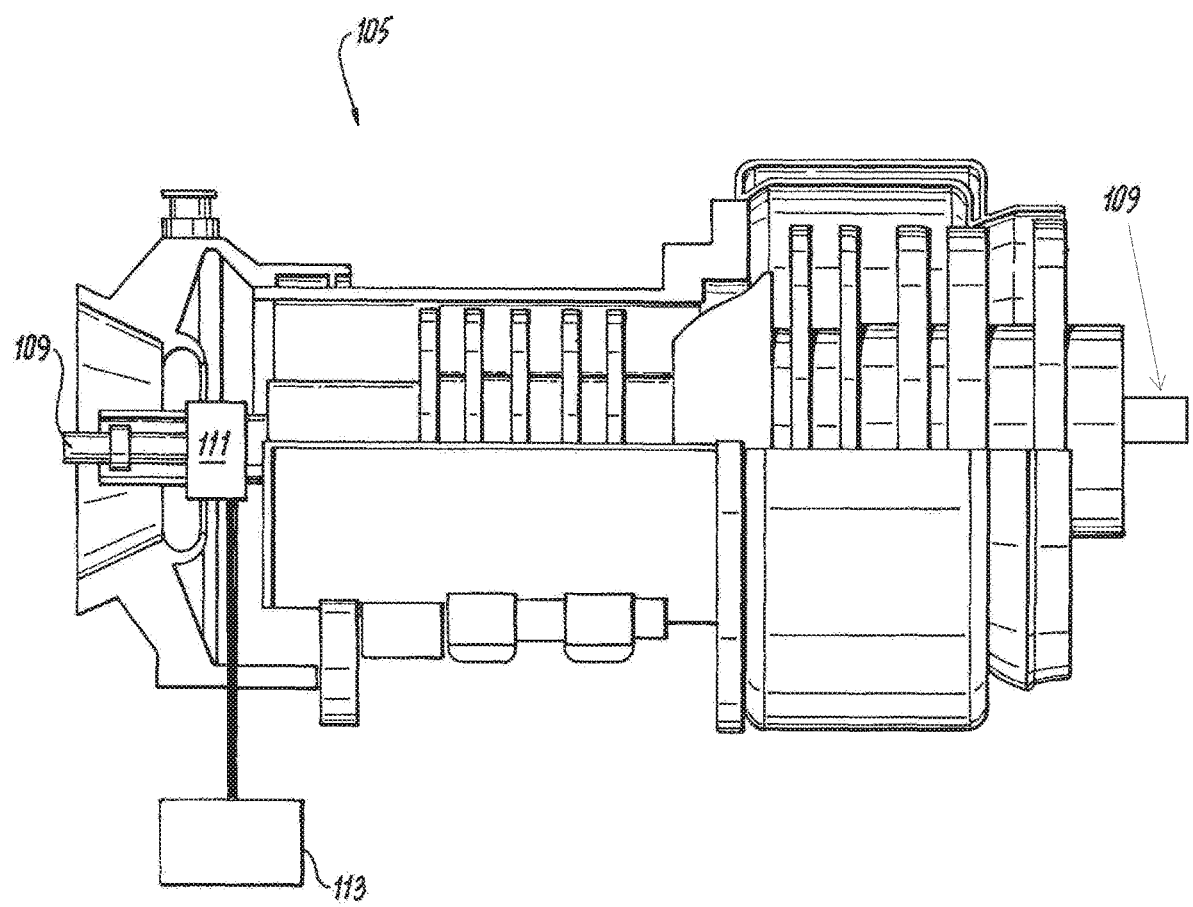
FIG. 2 is a partial cross-sectional view of an embodiment of a second engine in accordance with this disclosure.

Reference will now be made to the drawings wherein like reference numerals identify similar structural features or aspects of the subject disclosure. For purposes of explanation and illustration, and not limitation, an illustrative view of an embodiment of a rotorcraft in accordance with the disclosure is shown in FIG. 1 and is designated generally by reference character 100. Other embodiments and/or aspects of this disclosure are shown in FIG. 2. The systems and methods described herein can be used to reduce the weight of an aircraft and to allow more efficient, safe operation of certain aircraft.

Referring to FIG. 1, a rotorcraft 100 includes one or more first engines 101 operatively connected to a first rotor 103. The rotorcraft 100 also includes a second engine 105 operatively connected to a second rotor 107. In certain embodiments, the second engine 105 can be operatively connected to an electrical generator for driving an electrical system, for example.

The second engine 105 is a different size than the one or more first engines 103. For example, the second engine 105 can be smaller than the one or more first engines 103.

In certain embodiments, the second rotor 107 can be a tail rotor as shown. It is contemplated that the second rotor 107 can be any other suitable rotor (e.g., a propulsor, a second main rotor).

In certain embodiments, the second engine 105 can be an auxiliary power unit (APU) for the rotorcraft 100. In this regard, the second engine 105 can provide starting power for the one or more first engines 101 on start-up and/or power for electrical systems as needed. The second engine 105 can include any suitable engine design, e.g., a traditional APU that is then mechanically linked to the second rotor 107 (e.g., the tail rotor) of the rotorcraft 100.

In certain embodiment, referring additionally to FIG. 2, the second engine 105 can include a through shaft 109 and a clutch system 111 to selectively engage the through shaft 109. The through shaft 109 can be configured to operatively connect the at least one first engine 101 to the second rotor 107 to drive the second rotor 107 and/or to operatively connect the second engine 105 to the first rotor 103 to drive the first rotor 103 when the clutch system 111 is engaged.

The rotorcraft 100 can include a control system 113 configured to operate the clutch system 111. The control system 113 can be configured to determine whether the second engine 105 has failed in order to engage the clutch system 111 to cause one or more of the first engines to drive the second rotor 107. In certain embodiments, the control system 113 can be configured to determine whether the at least one first engine 101 has failed to engage the clutch system 111 to cause the second engine 105 to drive the first rotor 103.

While determination and reaction to a failure condition is disclosed herein, the control system and clutch system 111 do not have to be limited to use in failure scenarios. For example, certain embodiments of the control system 113 can monitor one or more flight and/or aircraft characteristics and engage the clutch system to have all engines operating together if desired (e.g., during climb or high power demand situations).

The control system 113 can include any suitable computer hardware, software, and/or any suitable mechanical elements to control the clutch system 111. For example, the control system 113 may be strictly mechanical (e.g., via a physical trigger that activates when one or more of the engines fail). In certain embodiments, the control system 113 includes a processor operatively connected to one or more electromechanical switches that operate the clutch system 111. In certain embodiments, the control system 113 is configured to notify the pilot of an engine failure, and thereby allow the pilot to manually engage the clutch system 111.

The one or more first engines 103 and second engine 105 can be turbomachines or any other suitable type of engine. In certain embodiments, the at least one first engine 103 can include two engines as shown connected to the main rotor via a gear box 115.

As shown, in certain embodiments, the through shaft 109 of the second engine 105 can be connected to the gear box 115 at a first end 109a, and/or the one or more first engines 101, and/or to any other suitable portion of the rotorcraft 100 to drive or be driven from the first rotor 103 or the first engines 101 in a failure condition, for example. In certain embodiments, the through shaft 109 of the second engine 105 is connected to the second rotor at a second end 109b, however, any other suitable connection is contemplated herein.

In accordance with at least one aspect of this disclosure, a method can include determining a state of at least one first engine 101 and/or a second engine 105 to determine if engine failure of the at least one first engine 101 or the second engine 105 has occurred. If engine failure has occurred, the method includes engaging a clutch system 111 to selectively engage a through shaft 109 of the second engine 105 to operatively connect the at least one first engine 101 to the second rotor 107 to drive the second rotor 107 and/or to operatively connect the second engine 105 to the first rotor 103 to drive the first rotor 103.

Determining a state of the at least one first engine 101 and/or the second engine 105 can be performed by a control system 113, e.g., as described hereinabove. The control system 113 can automatically engage the clutch system 111 based on the determination of an engine failure.

Embodiments as described above involve using engines of various power classes on the same aircraft. For example, as shown in the embodiment depicted in FIG. 1, two engines (or any other suitable number) of the same power class can be used to drive a main rotor and a completely different engine can be used to drive the tail rotor or propulsor. Each engine can be optimized for the needs of the specific power absorber.

Embodiments of the second engine can be a "through" power design, e.g., to preserve a redundant power path to allow the main rotor primary engines to also be able to power the tail rotor/propulsor in the event of a tail rotor/propulsor primary engine failure. Certain embodiments allow the one or more main engines the ability to drive the tail rotor and/or the second engine to drive the main rotor, and vice versa.

Accordingly, embodiments allow downsizing of main engines which can allow for a more efficient cruise. During climb, for example, it is also contemplated that all engines can be used for climb power if desired by engaging the second engine 105 to the one or more first engines. As described above, the second engine 105 can be used as an APU which can eliminate the need for another APU.

By way of example, aspects of the invention can be used in coaxial helicopters, on tail rotors, or wings or propeller blades on fixed or tilt wing aircraft.

As will be appreciated by those skilled in the art, aspects of the present disclosure may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized (e.g., a non-transitory medium). The computer readable medium may be a computer readable signal medium or a computer readable storage medium. A computer readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

The methods and systems of the present disclosure, as described above and shown in the drawings, provide for engine systems with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A rotorcraft, comprising:
   at least one first engine operatively connected to a first rotor;
   a gear box associated with the first rotor;
   a second engine operatively connected to a second rotor, the second engine being a different size than the first engine, wherein the second engine is positioned inline with the gearbox and the second rotor;
   a through shaft for operatively connecting the at least one first engine to the second rotor, the through shaft extending through at least a portion of a body of the second engine, wherein a first end of the through shaft is connected to the gear box and a second end of the through shaft is connected to the second rotor;
   a clutch system mounted to the second engine and operable to selectively engage the through shaft; and
   a control system configured to operate the clutch system to couple the second engine to the through shaft in response to detecting a failure of the at least one first engine or the second engine.

2. The rotorcraft of claim 1, wherein the second engine is smaller than the at least one first engine.

3. The rotorcraft of claim 1, wherein the second rotor is a tail rotor.

4. The rotorcraft of claim 1, wherein the second engine is an auxiliary power unit (APU) for the rotorcraft.

5. The rotorcraft of claim 1, wherein the through shaft is configured to operatively connect the at least one first engine to the second rotor to drive the second rotor and/or to operatively connect the second engine to the first rotor to drive the first rotor when the clutch system is engaged.

6. The rotorcraft of claim 1, wherein the at least one first engine and second engine are turbomachines.

7. The rotorcraft of claim 1, wherein the at least one first engine includes two engines connected to the main rotor via the gear box.

8. The rotorcraft of claim 1, wherein the control system is configured to determine whether the second engine has failed to engage the clutch system to cause the first engine to drive the second rotor.

9. The rotorcraft of claim 8, wherein the control system is configured to determine whether the at least one first engine has failed to engage the clutch system to cause the second engine to drive the first rotor.

\* \* \* \* \*